United States Patent [19]

Kawasaki et al.

[11] Patent Number: 5,342,703
[45] Date of Patent: Aug. 30, 1994

[54] SOLID ELECTROLYTE TYPE FUEL CELL AND METHOD FOR PRODUCING THE SAME

[75] Inventors: Shinji Kawasaki, Nagoya; Shigenori Ito, Kasugai; Katsuki Yoshioka, Nagoya, all of Japan

[73] Assignee: NGK Insulators, Ltd., Japan

[21] Appl. No.: 913,490

[22] Filed: Jul. 15, 1992

[30] Foreign Application Priority Data

Jul. 19, 1991 [JP] Japan .................................. 3-203692
Feb. 3, 1992 [JP] Japan .................................. 4-46344

[51] Int. Cl.$^5$ ............................................ H01M 8/12
[52] U.S. Cl. ...................................................... 429/30
[58] Field of Search ........................ 429/30, 44, 45, 33

[56] References Cited

U.S. PATENT DOCUMENTS

| | | | |
|---|---|---|---|
| 3,198,666 | 8/1965 | Gruneberg | 429/30 |
| 3,219,730 | 11/1965 | Bliton et al. | 429/30 |
| 3,525,646 | 8/1970 | Tannenberger et al. | 136/86 |
| 4,316,944 | 2/1982 | Landsman et al. | 429/44 |
| 4,490,444 | 12/1984 | Isenberg | 429/31 |
| 4,597,170 | 7/1986 | Isenberg | 29/623.5 |
| 4,614,628 | 9/1986 | Hsu et al. | 264/61 |
| 4,725,346 | 2/1988 | Joshi | 204/242 |
| 4,808,493 | 2/1989 | Breault | 429/44 |
| 4,997,726 | 3/1991 | Akiyama et al. | 429/30 |
| 5,035,962 | 7/1991 | Jensen | 429/44 |

FOREIGN PATENT DOCUMENTS

| | | |
|---|---|---|
| 180289 | 5/1986 | European Pat. Off. . |
| 0410420 | 1/1991 | European Pat. Off. . |
| 476808 | 3/1992 | European Pat. Off. . |
| 61-198569 | 9/1986 | Japan . |
| 61-198570 | 9/1986 | Japan . |
| 3-59953 | 3/1991 | Japan . |
| 4-115469 | 4/1992 | Japan . |
| 1011353 | 11/1965 | United Kingdom ................... 429/90 |

OTHER PUBLICATIONS

"Energy Sogo Kogaku" 13-2, 1990, pp. 52-68.
"Sunshine Journal" vol. 2, No. 1, 1981, pp. 26-36.
"Structural Properties of Plasma-Sprayed Zirconia-Based Electrolytes" Journal of Materials Science 23, 1988, pp. 3764-3770.
Stability of Perovskite Oxide Electrode with Stabilized Zirconia, O. Yamamoto, et al., University of Mie, International Symposium on Solid Oxide Fuel Cell Japan Fine Ceramics Center (Nagoya/Japan), Nov. 13-14, 1989, Proceedings of SOFC-Nagoya, pp. 87-92.
Conductivity of Porous Ni/ZrO$_2$-Y$_2$O$_3$ Cermets, D. W. Dees at al., Journal of Electrochemical Society: Electrochemical Science and Technology, vol. 134, No. 9, Sep. 1987, pp. 2141-2146.
Structure and Polarization Characteristics of Solid Oxide Fuel Cell Anodes, T. Kawada et al., Solid State Ionics 40/41 (1990), pp. 402-406.
Chemical Abstracts, vol. 115, No. 2, Jul. 15, 1991, Columbus, Ohio, USA, Yamamoto, Osamv "Solid-electrolyte fuel cells", p. 217, abstract-No. 12 402p & Jpn. Kokai Tokkyo Koho JP 03,59 953.

*Primary Examiner*—David B. Springer
*Attorney, Agent, or Firm*—Parkhurst, Wendel & Rossi

[57] ABSTRACT

A solid electrolyte type fuel cell having decreased internal resistance and increased output and improved fuel utilization efficiency is provided. The fuel cell includes an air electrode substrate made of a perovskite series complexed oxide having the following composition of a formula $(La_{1-y}A_y)MO_3$, wherein A is at least one element selected from alkaline earth metals, M is manganese or cobalt, and y is $0 \leq y \leq 0.4$, a zirconia solid electrolyte film containing manganese or cobalt solid soluted at at least the neighborhood of the interface thereof with the air electrode substrate, and a fuel electrode film formed on the solid electrolyte film at a surface opposite to the air electrode substrate. The fuel cell does not include a highly resistive layer made of a compound containing lanthanum and zirconium at the interface between the air electrode substrate and the solid electrolyte film. Methods for producing the fuel cell are also disclosed.

4 Claims, 23 Drawing Sheets

FIG_1a 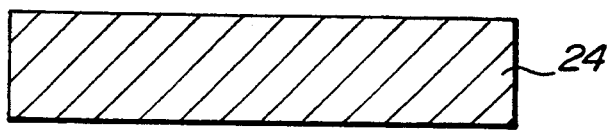
FIG_1b 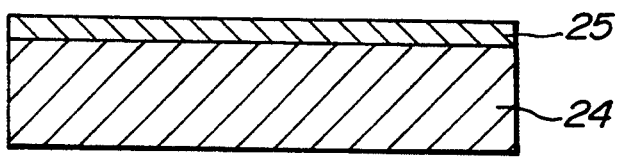
FIG_1c 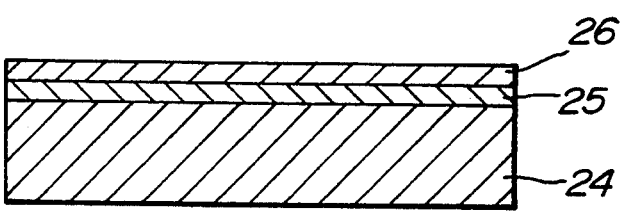
FIG_1d 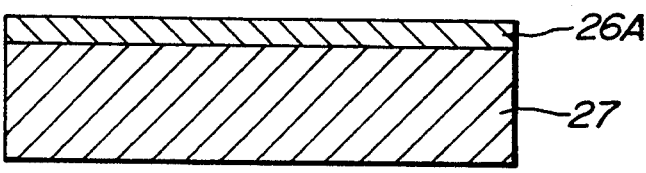
FIG_1e 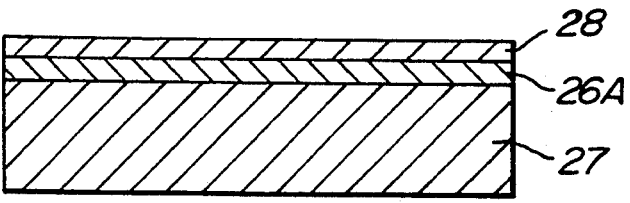

FIG_5

FIG_8

FIG_10

FIG_11

FIG_13

FIG_18a
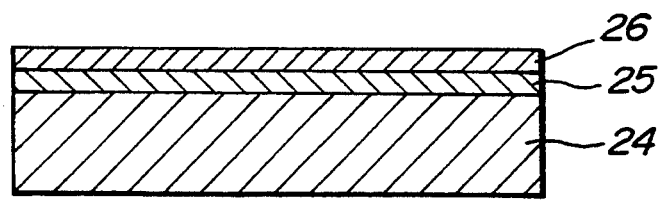
FIG_18b
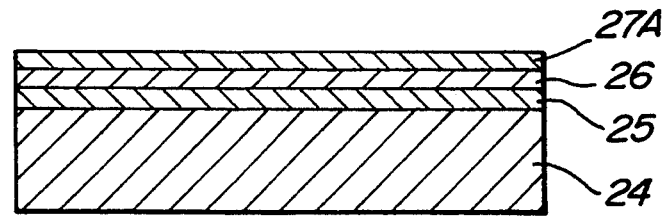

SOLID ELECTROLYTE TYPE FUEL CELL AND METHOD FOR PRODUCING THE SAME

BACKGROUND OF THE INVENTION

1. Field of the Invention

This invention relates to a solid electrolyte type fuel cell and a method for producing the same.

2. Related Art Statement

Recently, fuel cells have been noted as power generating implements. The fuel cell is an implement capable of directly converting chemical energy included in a fuel to electric energy. As the fuel cell is free from limitation of Carnot's cycle, the cell is a very promising technique owing to its inherently high energy conversion efficiency, wide latitude of fuels to be used (naphtha, natural gas, methanol, coal reformed gas, heavy oil and the like), less public nuisance, and high electric power generating efficiency without being affected by scales of installations.

Particularly, as the solid electrolyte fuel cell (referred to as "SOFC", hereinafter) operates at high temperatures such as 1,000° C., activity of electrodes is very high. Moreover, the SOFC has low polarization and relatively high output voltage without requiring any catalyst of an expensive noble metal such as platinum, so that energy conversion efficiency is much higher than those of the other fuel cells. Furthermore, the SOFC is stable and has long service life because all the constituent materials of the SOFC are solid.

The production technique for preparing SOFC must be capable of preparing thin and airtight solid electrolyte films as quickly as possible at low costs.

At present, stabilized zirconia and lanthanum series perovskite complexed oxides are the most promising and usual materials, respectively, for constituting the solid electrolyte films and the air electrodes of the SOFC (Energy Sogo Kagaku 13-2, 1990).

Usually, production methods of the solid electrolyte films and the air electrodes are classified as dry processes and wet processes. Electrochemical vapor deposition (EVD) and thermal spray are typical of the dry processes, while tape casting, slip casting and extrusion molding, etc., are typical of the wet processes (Energy Sogo Kagaku 15-2, 1990).

If the production is effected by the so-called "gas phase process" such as chemical vapor deposition (CVD), or EVD, etc., the apparatus used for the process becomes large, and the surface area that can be treated and the speed of the treatment are untolerably small. Moreover, the running cost of the gas phase process is expensive, because zirconium chloride in admixture with a helium gas or steam water inadmixture with oxygen is used.

If the solid electrolyte film is formed by plasma thermal spray, the film-forming rate can be made large, the handling of the apparatus is simple, and relatively dense thin films can be formed. Therefore, plasma thermal spray has conventionally been used (Sunshine Journal 2, [1], 1981; and Energy Sogo Kagaku 13-2, 1990).

It has also publicly been known to form a solid electrolyte film by solid soluting cerium oxide or zirconium oxide with a metal oxide of an alkaline earth metal or a rare earth element, etc., to prepare a raw material for thermal spray, adjusting the particle size of the raw material, and plasma spraying the adjusted raw material of the thermal spray (Japanese Patent Application Laid-open Nos. 61-198,569 and 61-198,570).

Meanwhile, the solid electrolyte films formed by plasma thermal spray usually have a porosity of more than 5% reaching even up to 10%, so that they are not sufficiently dense as the solid electrolyte films for use in SOFC, and cracks and layer defects occur in the films formed by plasma thermal spray. As a result, leakage of a fuel occurs thus permitting permeation of hydrogen, and carbon monoxide, etc., through the solid electrolyte film at the time of operating the SOFC to decrease electromotive force of the SOFC per unit cell thereof and thereby lower the output of the SOFC and conversion efficiency of the fuel to electric power.

The inventors previously proposed a technique of at first plasma thermal spraying a solid electrolyte film on a surface of the air electrode, and then heat treating the film to densify the same (Japanese Patent Application Laid-open No. 4-115,469 filed on Sep. 4, 1990). However, the inventors have found out afterwards, that if the heat treatment temperature is sufficiently high, a highly resistive layer made of electrically insulative lanthanum zirconate $La_2Zr_2O_7$, etc., is formed at the interface between the solid electrolyte film and the air electrode.

There is also known a method of forming a film made of a raw material for solid electrolyte on the air electrode by a wet process, and sintering the film to join the solid electrolyte film to the air electrode. However, if the heat treatment is effected at around 1,250° C. for the purpose, a highly resistive layer consisting of electrically insulative lanthanum zirconate $La_2Zr_2O_7$ is formed on the interface between the solid electrolyte and the air electrode, which increases the internal resistance of the SOFC to lower the output of the SOFC.

Recently, a proposal has been made wherein stabilized zirconia is used as a raw material for solid electrolyte film, and a perovskite series complexed oxide of a formula $(La_{1-y}Sr_y)_{1-x}MO_3$ wherein y is $0 \leq y \leq 0.2$, x is $0 < x \leq 0.2$, M is Mn or Co and the A site is stoichiometrically portionally defected is used as the raw material for the air electrode film (Japanese Patent application Laid-open No. 3-59,953).

The inventors newly studied using such a defected perovskite series complexed oxide as a raw material for a free-standing type air electrode tube of a bottomed tubular shape. As a result, the inventors have found out that such a compound has a remarkably high sintering property owing to its rich content of manganese or cobalt as compared with that of nondefected perovskite structure. Therefore, the inventors have also found out a new problem in that the sintering of the air electrode tube progresses during the steps of various heat treatments of the air electrode tube for forming other cell components to decrease the ability of transporting an oxidizing agent to the interface between the solid electrolyte film and the air electrode tube.

SUMMARY OF THE INVENTION

An object of the present invention is to suppress the reaction between the solid electrolyte film made of zirconia and the material for the air electrode substrate, decrease the internal resistance of the SOFC, suppress the progression of the sintering of the air electrode, and improve the output of the SOFC and utilization efficiency of a fuel gas used for the SOFC.

In the first aspect of the present invention, a solid electrolyte type fuel cell includes an air electrode substrate made of a perovskite series complexed oxide having the following composition of a formula $(La_{1-y}A_y)MO_3$ wherein A is at least one element selected from alkaline earth metals, M is manganese or cobalt, and y is $0 \leq y \leq 0.4$, a zirconia solid electrolyte film containing manganese or cobalt solid soluted at least the neighborhood of the interface thereof between the air electrode substrate, and a fuel electrode film formed on the solid electrolyte film at a surface opposite to the air electrode substitute, characterized in that the fuel cell is substantially not provided with a highly resistive layer made of a compound containing lanthanum and zirconium at the interface between the air electrode substrate and the solid electrolyte film.

In the second aspect of the present invention, a method for producing a solid electrolyte type fuel cell, comprises forming an intermediate layer consisting of a manganese compound or cobalt compound on a surface of a material for air electrode made of a perovskite series complexed oxide having the following composition of a formula $(La_{1-y}A_y)MO_3$ wherein A is at least one element selected from alkaline earth metals, M is manganese or cobalt, and y is $0 \leq y \leq 0.4$, providing a film made of a material for the solid electrolyte body on the surface of the intermediate layer to form a layered structure, heat treating the thus obtained layered structure to extinguish the intermediate layer while changing the film of the material for the solid electrolyte to an airtight solid electrolyte film. This method will be referred to as "the first method of the present invention" or "the present first method", hereinafter.

In the third aspect of the present invention, a method for producing a solid electrolyte type fuel cell includes a step of forming a film of a material for the solid electrolyte film on an electrode of the cell, comprises forming a film of a material for an airtight solid electrolyte on the electrode, providing a compound film made of a manganese compound or a cobalt compound on the surface of the material for the solid electrolyte film to form a layered structure, and then heat treating the layered structure to change the film of the material for the solid electrolyte film to an airtight solid electrolyte film. This method will be referred to as "the second method, of the present invention" or "the present second method", hereinafter.

BRIEF DESCRIPTION OF THE DRAWINGS

For a better understanding of the present invention, reference is made to the accompanying drawings, in which:

FIGS. 1a–1e are cross-sectional views for explaining sequential steps of forming an air electrode substrate 27, a solid electrolyte film 26A and a fuel electrode film 28;

FIG. 18a is a cross-sectional view of a layered structure same as that of FIG. 16c;

FIG. 18b is a cross-sectional view of the layered structure of FIG. 18a further having a compound film 27a formed thereon;

Figure 2A:
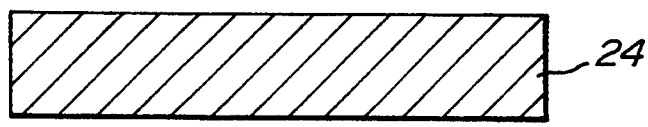
FIGS. 2a–2c are cross-sectional views for explaining the steps of forming an intermediate layer 25.

| | Numbering in the Drawings: |
|---|---|
| 1 | bottomed tube-shaped air electrode |
| 1a | inner space of the air electrode tube 1 |
| 1b | bottom portion of the air electrode tube 1 |
| 1c | tubular portion of the air electroe tube 1 |
| 2,26A | solid electrolyte film |
| 3,28,29 | fuel electrode film |

-continued

| | Numbering in the Drawings: |
|---|---|
| 4 | oxidizing gas inlet pipe |
| 4a | oxidizing gas supply mouth |
| 5 | upper plate |
| 6 | middle plate |
| 6a | round perforation hole |
| 7 | exhaust gas chamber |
| 8 | cell reaction chamber |
| 9 | bottom plate |
| 9a | fuel inlet hole |
| 10 | fuel gas chamber |
| 13 | platinum paste |
| 14 | platinum net |
| 15 | lead wire |
| 16 | impedance analyzer |
| 19 | SOFC element |
| 20 | oxidizing gas chamber |
| 21 | jig |
| 22 | adhesive |
| 23 | sample |
| 24 | material for air electrode |
| 24A | air electrode substrate |
| 25 | intermediate layer |
| 25A | coating |
| 26 | film of a material for solid electrolyte |
| 26A | solid electrolyte film |
| 27 | air electrode substrate |
| 27A | compound film |
| 28 | fuel electrode film |
| 30 | arm |
| 31 | fulcrum |
| 32 | suppressor |

According to the present invention, the internal resistance of the SOFC can be decreased to improve the output of the SOFC, while improving the airtight property of the solid electrolyte film to improve the fuel utilization efficiency. Moreover, the open porosity of the air electrode can be retained high in the present invention.

According to the present invention, the whole of the solid electrolyte film is uniformly densified, so that the airtight property of the solid electrolyte film is improved to increase the fuel utilization efficiency. Also, the strength of the solid electrolyte film per se can be remarkably increased, so that reliable SOFC can be mass produced.

DETAILED DESCRIPTION OF THE INVENTION

Hereinafter, the first method of the present invention will be explained in sequence.

At first, a material 24 for the air electrode of a desired shape, such as a plate shaped, as shown in FIG. 1a, is prepared which is made of a perovskite series complexed oxide having a composition of the formula $(La_{1-y}A_y)MO_3$ wherein A is at least one element selected from alkaline earth metals, M is manganese or cobalt, and y is $0 \leq y \leq 0.4$.

Though A is selected from alkaline earth metals, strontium and calcium are particularly preferable. In the above composition, La and A occupy the so-called "A site" of the perovskite structure, while M occupies the so-called "B site" of the structure.

Then, an intermediate layer 25 made of a manganese compound or a cobalt compound is formed on the surface of the material 24 for the air electrode, as shown in FIG. 1b, preferably by plasma thermal spray.

Next, a film 26 made of a material containing zirconia for the solid electrolyte is formed on the surface of the intermediate layer 25 to form a layered structure as shown in FIG. 1c. The film 26 is also preferably made by plasma thermal spray. As the raw material for the solid electrolyte, a mixture or a solid solution of zirconia and a compound (particularly, oxide) of an alkaline earth metal or a rare earth element is preferably used.

The thus obtained layered structure is heat treated to extinguish the intermediate layer 25 from the surface of the material 24 for the air electrode according to the later-described mechanism. Simultaneously, the film 26 of the material for solid electrolyte is changed to an airtight solid electrolyte film 26A. As a result, the airtight solid electrolyte film 26A is formed on the surface of the air electrode substrate 27, as shown in FIG. 1d. Thereafter, a fuel electrode film 28 is formed on the surface of the solid electrolyte film 26A to prepare an element of SOFC, as shown in FIG. 1e.

Figure 2B:
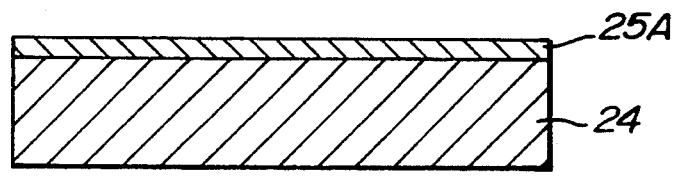
Figure 2C:
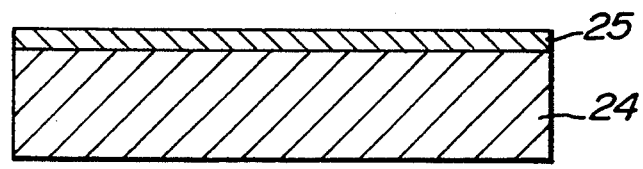

Alternatively, process steps as shown in FIG. 2a—FIG. 2c may be adopted. Namely, at first, the material 24 for the air electrode made of the above-described perovskite series complexed oxide is prepared, as shown in FIG. 2a. Then, a coating 25A containing a manganese compound or a cobalt compound is formed by a wet process on the surface of the material 24 for the air electrode, as shown in FIG. 2b. Concretely explain, dipping, slip casting, or extrusion, etc., is used for the wet process. Next, the coating 25A is heat treated to dissipate a solvent, etc., used in the wet process to form an intermediate layer 25 made of the manganese compound or the cobalt compound, as shown in FIG. 2c. Thereafter, the above process steps as described with reference to FIGS. 1c, 1d and 1e are followed to prepare an SOFC element.

According to the present first method, the intermediate layer 25 is provided between the material 24 for the air electrode and the film 26 of the material for the solid electrolyte, as shown in FIG. 1c, for example. If the layered structure at this stage is heat treated, manganese or cobalt is removed and diffused from the intermediate layer 25 toward the film 26. As a result, manganese or cobalt is solid soluted in the zirconia solid electrolyte film at least at the neighborhood of the interface thereof with the air electrode substrate. The inventors have discovered that the diffused element of manganese or cobalt has a function of accelerating the densification of the film 26. Therefore, by utilizing this function, the zirconia solid electrolyte film 26A can be afforded with sufficient airtight property even when the temperature of the heat treatment is lowered a little.

Moreover, the inventors have also found out that, by providing the intermediate layer 25, not only the sintering of the film 26 can be accelerated as described above, but also the reaction between the zirconia in the film 26 and lanthanum in the material 24 for the air electrode can be suppressed which reaction forms a highly resistive layer made of $La_2Zr_2O_7$, etc. Namely, the inventors have discovered that even when a sufficient heat treatment to cause the film 26 airtight was performed on the layered structure, a highly resistive layer made of a compound $La_2Zr_2O_7$, etc., was not formed on the interface between the air electrode substrate 27 and the solid electrolyte film 26A.

Nevertheless, even in the present invention, a microscopically small amount of a highly resistive compound, such as $La_2Zr_2O_7$, etc., is sometimes formed at the interface between the air electrode substrate 27 and the solid electrolyte film 26A. However, such a highly resistive compound is not formed continuously in a layer form viewed from a photograph of a cross-section thereof taken by a scanning electron microscope.

In this way, the highly resistive layer made of the compound containing lanthanum and zirconium can be excluded, so that the high electric resistance and the large decrease in output of the SOFC element (unit cell) caused by the highly resistive layer can be prevented.

Moreover, the above-described perovskite series complexed oxide in which the A site is not defected is used as the material 24 for the air electrode in the present invention. The complexed oxide is stable and the sintering thereof is not progressed, at high temperatures of up to about 1,550° C. Therefore, even when a sufficient heat treatment to make the film 26 airtight is performed on the whole layered structure including the material 24 for the air electrode, the porosity of the air electrode substrate 27 is not changed substantially. Therefore, the efficiency of the SOFC element of generating an electric power is not decreased.

Preferably, the film 26 made of a material for the solid electrolyte is formed by plasma thermal spray. Namely, plasma thermal spray is technically simple as compared with EVD which is a conventional method of producing a dense thin film solid electrolyte, and can form a film by using a usual thermal spray apparatus and an usual electric furnace for heat treatment, so that it can be effected at low cost.

It is difficult to produce a plate-shaped solid electrolyte fuel cell, using EVD though it can currently produce a relatively small tubular solid electrolyte fuel cell. Regarding this point, the thermal spray method is applicable to both the plate-shaped and the tubular solid electrolyte films. It can also cope with production of the solid electrolyte film of a large size, such as an elongated tube or a flat plate of a large surface area. Moreover, in the present invention, the thermal sprayed solid electrolyte film is heat treated to make the film airtight. Conventional thermal sprayed electrolyte films not treated with the heat treatment have microstructures with microcracks and defects inherent to thermal sprayed films and also have multi-layer defects, which are the cause of decrease of the electrical conductivity and leakage of the gases.

In contrast, the thermal sprayed electrolyte film after the above heat treatment has no microcracks and defects inherent to the conventional thermal sprayed films, less layer defects, and comparatively sphere-shaped or nearly sphere-shaped closed pores by virtue of a movement of the material for electrolyte films towards the sharp angled surfaces and corners of the cracks, thereby attaining microstructures nearly similar to the microstructures of solid electrolytes obtained by press forming a powder and sintering the formed powder, as well as homogeneous composition. As a result, the electrical conductivity of the thermal sprayed and heat treated electrolyte film is equal to that of the sintered bodies to prevent leakage of gases.

As the plasma thermal spray used herein, low pressure plasma spray has a larger effect than normal pressure plasma thermal spray. However, even when the solid electrolyte film 26 is formed by the normal pressure plasma thermal spray, a sufficiently airtight solid electrolyte film 26A can be formed by the subsequent heat treatment.

Preferably, the heat treatment is effected at a temperature of 1,300°–1,500° C.

If the temperature of the heat treatment is less than 1,300° C., the effect of the temperature influencing on the airtight property of the solid electrolyte film is not remarkable and a prolonged time is necessary for the heat treatment. If the temperature exceeds 1,500° C., the solid electrolyte film is excessively sintered and the pores are increased.

As the abovedescribed manganese compound, preferably use is made of $Mn$, $MnO$, $MnO_2$, $Mn_3O_4$ or a perovskite series complexed oxide wherein the A site is portionally defected or a mixture thereof.

As the abovedescribed cobalt compound, preferably use is made of $Co$, $CoO$, $Co_3O_4$ or a perovskite series complexed oxide wherein the A site is portionally defected or a mixture thereof.

The abovedescribed intermediate layer is preferably made of a manganese compound, rather than from a cobalt compound, because a manganese compound has a more remarkable effect of making the solid electrolyte film airtight than a cobalt compound.

The intermediate layer is preferably formed in an amount of 0.2–8.0 mg per unit area of the material for the air electrode. If the amount is less than 0.2 mg, the effect of making the solid electrolyte film airtight and the effect of preventing the formation of the highly resistive layer are not remarkable, while if the amount exceeds 8.0 mg, the intermediate layer tends to remain after the heat treatment to deteriorate the characteristic properties of the fuel cell.

Preferably, the solid electrolyte film has a manganese or cobalt solid soluted amount of 3–15 mole % at least the neighborhood of the interface between the air electrode. If the amount is less than 3 mole %, the airtight property of the solid electrolyte is remarkably decreased, while if it exceeds 15 mole %, precipitation of Mn at the time of operating the fuel cell is considerably large. A preferable amount is 5–12 mole %.

Next, the second method of the present invention will be explained sequentially.

The word "electrode" used in the present second method means an air electrode or a fuel electrode. The "electrode" has two modes of embodiment. In the first mode of embodiment, the electrode per se is a free-standing type substrate. In the second mode of embodiment, a substrate is formed from a porous ceramic, such as, zirconia, etc., and an electrode film is provided on a surface of the substrate.

Hereinafter, for facilitating the understanding of the present invention, explanations will be made on the case of using a free-standing type air electrode substrate. However, of course, the present invention is applicable to other types of air electrode substrates.

Figure 16A:
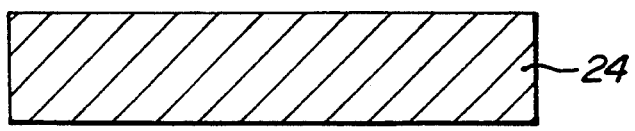
FIG. 16a is a cross-sectional view of a plate-shaped material 24 for air electrode.

At first, a material 24 for the air electrode of a desired shape, such as, a plate shape, is prepared as shown in FIG. 16a.

Figure 16B:
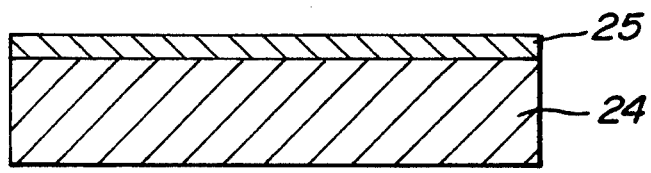
FIG. 16b is a cross-sectional view of the plate-shaped material 24 having an intermediate film 25 thereon.

Then, an intermediate film 25 made of a manganese compound or a cobalt compound is formed on a surface of the material 24 for the air electrode, preferably by plasma thermal spray, as shown in FIG. 16b.

Figure 16C:
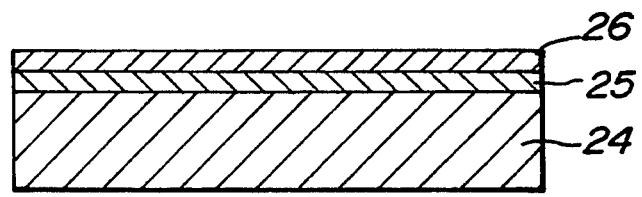
FIG. 16c is a cross-sectional view of the plate-shaped material 24 having the intermediate film 25 and further a film 26 of a material for solid electrolyte thereon.

Subsequently, on a surface of the intermediate film 25 a material film 26 for the solid electrolyte is formed of a material containing zirconia for the solid electrolyte, as shown in FIG. 16c. The film 26 is preferably formed also by plasma thermal spray. As the material for the solid electrolyte, use is made of a mixture or a solid solution of zirconia and a compound (particularly oxide) of an alkaline earth metal or a rare earth element.

Figure 17A:
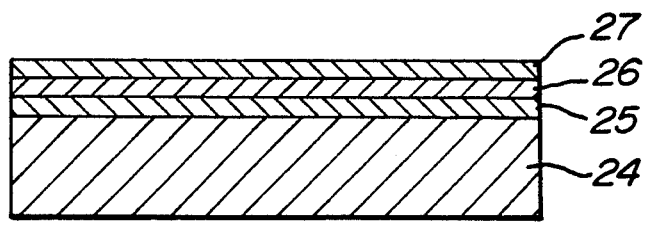
FIG. 17a is a cross-sectional view of a layered structure having a compound film 27 formed on the film 26 of FIG. 16c.
Figure 17B:
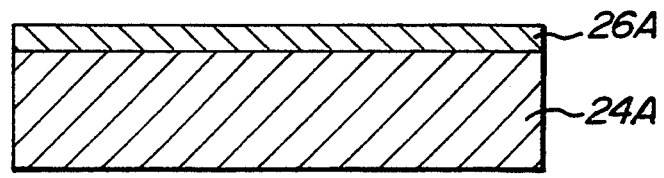
FIG. 17b is a cross-sectional view of the laminated structure after the heat treatment.
Figure 17C:
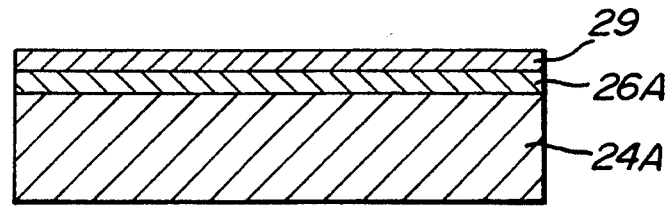
FIG. 17c is a cross-sectional view of the heat treated layered structure having a fuel electrode film 29 formed thereon.

Thereafter, on a surface of the material film 26 for the solid electrolyte is formed a compound film 27 made of a manganese compound or a cobalt compound, as shown in FIG. 17a. The thus obtained layered structure is heat treated to extinguish the intermediate film 25 and the compound film 27 according to the later-described mechanisms. Simultaneously, the intermediate layer 25 is extinguished from the material 24 for the air electrode, and the material film 26 for the solid electrolyte is changed to an airtight solid electrolyte film 26A, leaving the airtight solid electrolyte film 26A formed on the air electrode substrate 24A, as shown in FIG. 17b. Afterwards, a fuel electrode film 29 is provided on a surface of the solid electrolyte film 26A, as shown in FIG. 17c.

An alternative method of forming the compound film by a wet process will be explained sequentially, hereinbelow.

At first, an intermediate film 25 and a material film 26 for the solid electrolyte are formed sequentially on a material film 24 for the air electrode, as shown in FIG. 18a. Next, on a surface of the material film 26 for the solid electrolyte is formed a compound film 27A containing a manganese compound or a cobalt compound by a wet process, as shown in FIG. 18b. Concrete examples of the wet process are dipping, spray coating and screen printing, etc. Subsequently, in the same manner as explained with reference to FIGS. 17b and 17c, a SOFC element is produced.

If a heat treatment is effected on the layered structure as shown in FIG. 17a, manganese or cobalt is moved and diffused from the intermediate film 25 and the compound film 27 towards the solid electrolyte film 26. The inventors have discovered that the sintering of the material film 26 for the solid electrolyte is largely accelerated particularly by the diffusion of manganese or cobalt from the compound film 27. Even when the airtight solid electrolyte film 26A had a thickness of around 200 $\mu$m, sufficient airtight property, reliability and strength of the film were obtained.

The effects are increased more by the diffusion of manganese or cobalt from the intermediate film 25, because such a diffusion accelerates airtightness of the neighborhood of the interface thereof with the air electrode substrate.

The material film 26 for the solid electrolyte is preferably formed by plasma thermal spray. This is because plasma thermal spray is technically simple as compared with a conventional EVD method of producing a dense solid electrolyte thin film and can be used to form a film with low cost if only a usual thermal spray apparatus and a usual electric furnace for the heat treatment are available.

Though the EVD method currently can produce relatively small tubular solid electrolyte type fuel cells, it is difficult to produce a flat plate-shaped solid electrolyte type fuel cell. In contrast, thermal sprayed solid electrolyte films are applicable to both the flat plate-shaped and tubular shaped fuel cells, and can easily cope with production of large size solid electrolyte films, such as, elongated tubes, and large surface area flat plates.

Plasma thermal sprayed films have usually inherent microcracks and defects and also several layers of layer defects.

When the electrode is an air electrode made of a perovskite series complexed oxide having a composition of the following formula:

$$(La_{1-y}A_y)MO_3$$

wherein y is $0 \leq y \leq 0.4$, and A is an element selected from alkaline earth elements and preferably calcium or strontium, La and A occupy the so-called "A site" of the perovskite structure and M occupies the so-called "B site" of the perovskite structure, if the material film for solid electrolyte is provided directly on a surface of the air electrode, a highly resistive layer is formed at the interface between the air electrode and the material film for the solid electrolyte at the time of the later heat treatment.

The inventors have found out that, in this case, if the intermediate layer 25 is provided on a surface of the material 24 for air electrode, a reaction between zirconia in the material film 26 for the solid electrolyte and lanthanum in the material 24 for the air electrode can be prevented. Namely, even when a heat treatment sufficient to make the film 26 airtight was effected on the laminated structure, a highly resistive layer made of compounds, such as $La_2Zr_2O_7$, etc., was not formed at the interface between the air electrode substrate 24A and the airtight solid electrolyte film 26A.

DESCRIPTION OF THE PREFERRED EMBODIMENTS

Hereinafter, the present invention will be explained in detail with reference to examples.

EXAMPLE 1

Figure 3:
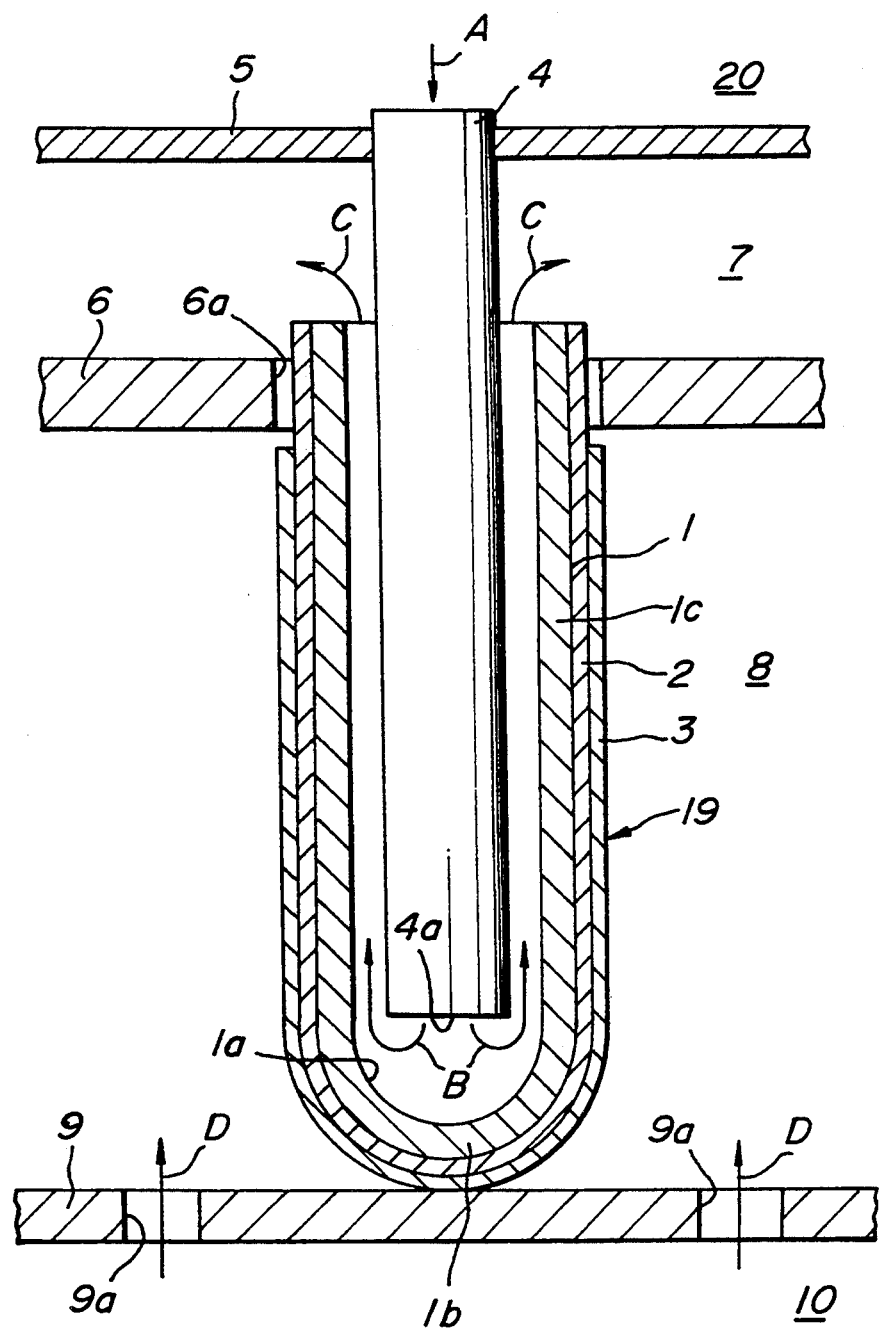
FIG. 3 is a schematic cross-sectional view of an embodiment of an SOFC to which the present invention is applicable.

In this embodiment, an example of SOFC to which the present invention is applicable will be explained. FIG. 3 is a schematic cross-sectional view of an embodiment of such an SOFC.

Referring to FIG. 3, an oxidizing gas chamber 20 and an exhaust gas chamber 7 are separated by an upper plate 5, the exhaust gas chamber 7 and a cell reaction chamber 8 are separated by a middle plate 6, and the cell reaction chamber and a fuel gas chamber 10 are separated by a bottom plate 9. An oxidizing gas inlet pipe 4 is supported and fixed by the upper plate 5. The middle plate 6 has a round perforation hole 6a which moderately holds the upper portion of a SOFC element 19.

The bottom plate 9 has fuel gas inlet holes 9a of a desired size and number. The SOFC element 19 has in its interior portion a bottomed tube-shaped air electrode 1 which consists of a tubular portion 1c extending vertically in the cell reaction chamber 8 and a substantially half sphere-shaped bottom portion 1b. The air electrode tube 1 has an inner space 1a which receives an oxidizing gas inlet pipe 4 inserted therein. An oxidizing gas supplying mouth 4a at the end of the inlet pipe 4 opposes the bottom portion 1b.

The air electrode tube 1 has at its outer circumferential wall a zirconia solid electrolyte film 2 formed thereon, and the zirconia solid electrolyte film 2 has a fuel electrode film 3 formed at the outer circumferential wall thereof. The SOFC element 19 has an electric current-generating portion in the cell reaction chamber or cell electric current-generating chamber 8, and the upper end portion of the electric current-generating portion is opened to the exhaust gas chamber 7.

At this state, if an oxidizing gas, such as, air, etc., is supplied from the oxidizing gas chamber 20 to the oxidizing gas inlet pipe 4 as shown by the arrow A, the oxidizing gas discharged from the oxidizing gas inlet pipe 4 through an oxidizing gas supply mouth 4a is diverted in a direction at the bottom portion 1b as shown by the arrow B to flow in the inner space 1a of the air electrode tube 1 and flowed out to the exhaust gas chamber 7 as shown by the arrow C. In the meantime, a fuel gas, such as, $H_2$ or $CH_4$, etc., is supplied from the fuel inlet holes 9a arranged at the bottom plate 9 as shown by the arrow D and flowed along the outer circumferential wall of the SOFC element 19. Due to the flow of the fuel, a flow of oxygen through the solid electrolyte film 2 is generated to react oxygen ions with the fuel at the fuel electrode film 3. As a result, an electric current flows between the air electrode tube 1 and the fuel electrode film 3. Because such a SOFC is used at a high temperature of around 1,000° C., the embodiment as shown in FIG. 3 which was constructed without using a sealed portion is considered as a preferable embodiment.

The fundamental air electrode tube 1 and solid electrolyte film 2 are constituted, of course, according to the present invention. The present invention is also applicable to a tubular SOFC element of which the both ends are opened (namely, not having a bottom portion) or a flat plate-shaped SOFC element, in the same manner as in this embodiment.

Hereinafter, concrete experimental results will be explained.

EXAMPLE 2

In this example, a sample of an SOFC element is prepared and tested.

At first, a raw material for an air electrode was prepared made of a perovskite series complexed oxide. Namely, at first, $La_2O_3$, $SrCO_3$ and $Mn_3O_4$ were prepared as starting raw materials.

Among the starting raw materials, a powder of $La_2O_3$ was preliminarily calcined in air at a temperature of 900° C. for 3 hrs. Then, the starting raw materials were weighed in a La:Sr:Mn mole ratio of 4:1:5, mixed together in a pot mill in wet process, formed at a pressure of 1 tf/cm$^2$ by a mold press, and heat treated in air at 1,450° C. for 15 hrs to synthesize a perovskite series complexed oxide. The synthesized product was pulverized to obtain a powdery raw material. The thus obtained powdery raw material was analyzed by emission spectrochemical analysis method and X-ray diffraction method to find out that the powdery raw material consists of a perovskite series complexed oxide having a composition of $La_{0.8}Sr_{0.2}MnO_3$.

Then, the powdery raw material was formed under a pressure of 500 kgf/cm$^2$ by a mold press method, and fired in air at 1,570° C. for 8 hrs.

The thus obtained sintered body was measured on open porosity by Archimedes method to obtain an open porosity of 29%.

A disc of a diameter of 20 mm and a thickness of 2 mm was cut out from the sintered body to prepare a material 24 for the air electrode as shown in FIG. 1a.

Then, manganese dioxide $MnO_2$ was prepared and plasma thermal sprayed on a surface of the material 24 for the air electrode to obtain an intermediate layer 25 of a thickness of about 10 μm. In addition, zirconia stabilized with 8 mole % yttria (8YSZ) was prepared and plasma thermal sprayed on a surface of the intermediate layer 25 to form a zirconia film 26 of a thickness of about 100 μm.

Then, the thus obtained layered structure was heat treated in air at 1,000° C., 1,200° C., 1,300° C. or 1,400° C. for 3 hrs to obtain a layered structure of a solid electrolyte film 26A and an air electrode substrate 27 as shown in FIG. 1d. Afterwards, the electric resistance of the layered structure was measured to evacuate the electrical properties thereof and the $N_2$ gas permeation coefficient of the layered structure was measured to evaluate the airtight property thereof.

Figure 4:
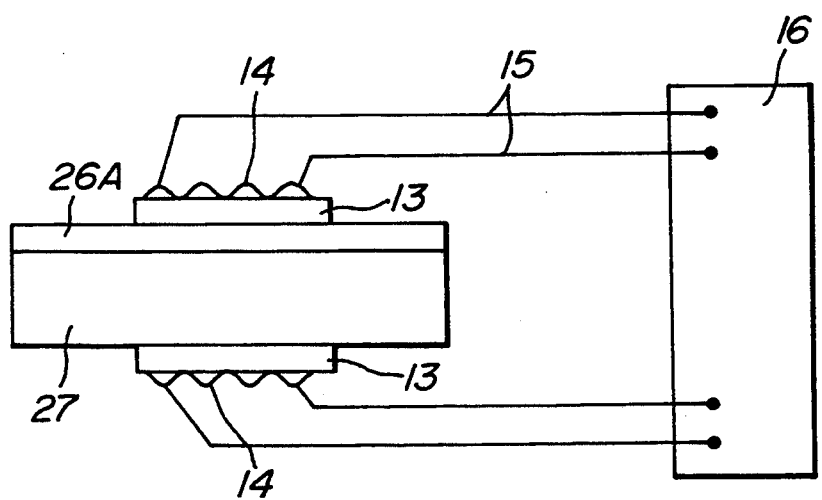
FIG. 4 is a diagram for explaining a method of measuring an electric resistance.

At that time, electric resistance of the layered structure was measured on an apparatus as shown in FIG. 4. Namely, a platinum paste 13 of a diameter of 6 mm was formed by a screen printing method on a surface of the air electrode substrate 27 and a surface of the solid electrolyte film 26A, respectively, baked in air at 1,000° C. for 1 hr to prepare a sample for measurement. A platinum net 14 was set on the surface of the platinum paste 13 of each sample, and each platinum net 14 was connected to a terminal of an impedance analyzer via a lead wire 15. Then, ohmic resistance of the layered structure was measured in air at 1,000° C. using an alternating current impedance method.

Figure 5:
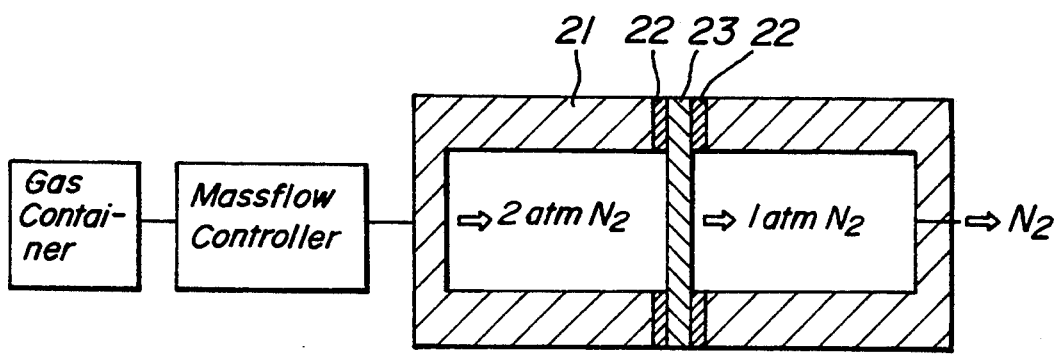
FIG. 5 is a block diagram for explaining a method of measuring an $N_2$ permeation coefficient.

$N_2$ gas permeation coefficient of the layered structure was measured using an apparatus as shown in the block diagram in FIG. 5. Namely, a desired sample 23 to be tested was set on a jig 21 and the spaces between the sample 23 and the jig 21 were sealed by an adhesive 22.

A surface of the sample 23 was exposed to a pressurized $N_2$ atmosphere of 2 atm and the other surface of the sample 23 was exposed to an $N_2$ atmosphere of normal pressure (measured at room temperature). At this time, the flow rate of nitrogen flowing from the 2 atm side to the 1 atm side was measured by a mass flow controller, and an $N_2$ gas permeation coefficient K (cm$^4$g$^{-1}$s$^{-1}$) was determined by the following equation:

$$K = t \cdot Q / (\Delta P \cdot A)$$

wherein t is a thickness of the sample, Q is $N_2$ gas permeation flow rate (cm$^3$/s), $\Delta P$ is a pressure differential (g/cm$^2$), and A is area (cm$^2$) of the opening of the jig 21.

At this time, the air electrode substrate 27 was solely set as the sample 23 on the jig 21 to measure an $N_2$ gas permeation coefficient $K_1$ thereof, while a layered structure of the air electrode substrate 27 and the solid electrolyte film 26A was set on the jig 21 as the sample 23 to measure an $N_2$ gas permeation coefficient $K_3$ thereof. An $N_2$ gas permeation coefficient $K_2$ of the solid electrolyte film 26A alone was calculated from the following formula:

$$K_2 = t_2 \cdot K_1 \cdot K_3 / (K_1 \cdot t_3 - t_1 K_3)$$

wherein $t_2$ is a thickness of the solid electrolyte film 26A, $t_3$ is a thickness of the layered structure, and $t_1$ is a thickness of the air electrode substrate 27.

Figure 6:
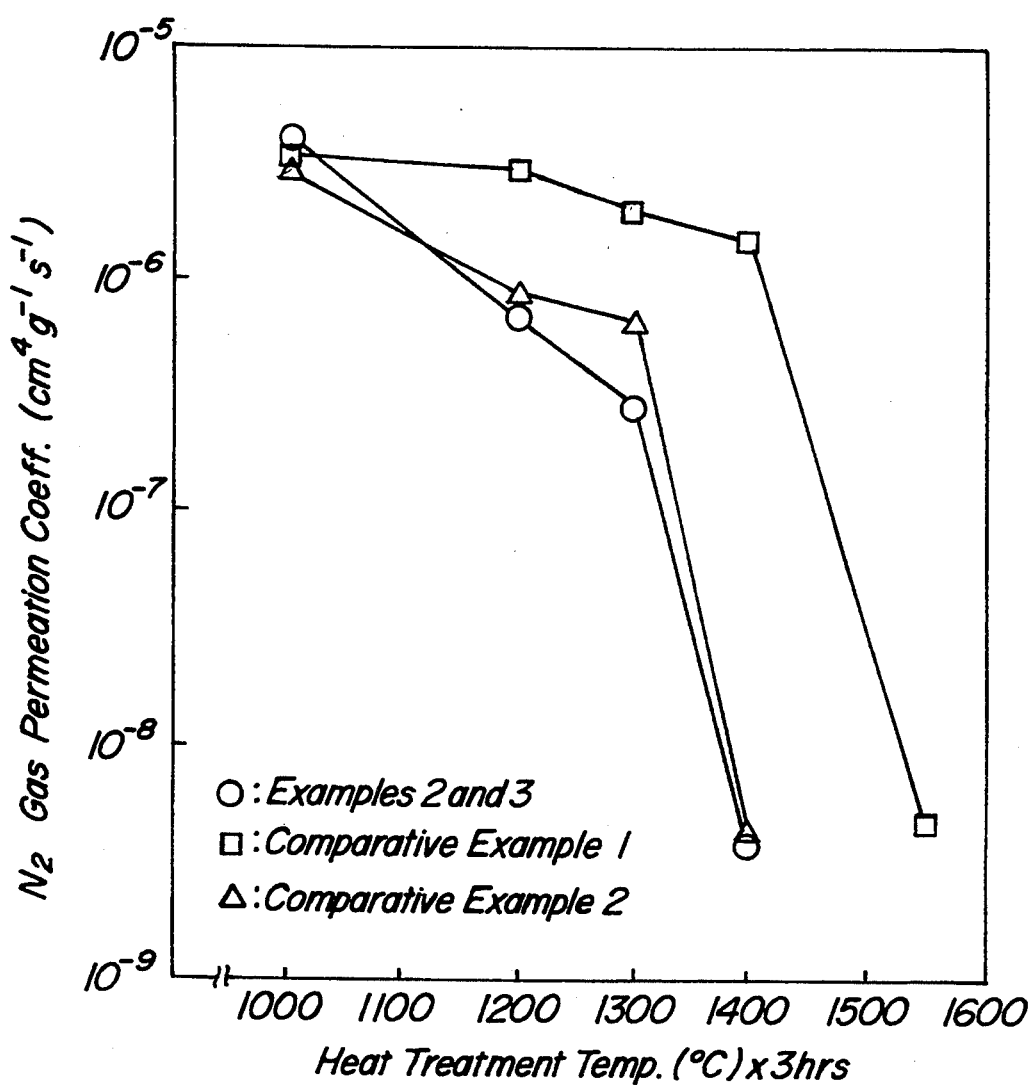
FIG. 6 is a characteristic graph of a thermal sprayed solid electrolyte film showing a relation between the heat treatment and $N_2$ permeation coefficient of the film.
Figure 7:
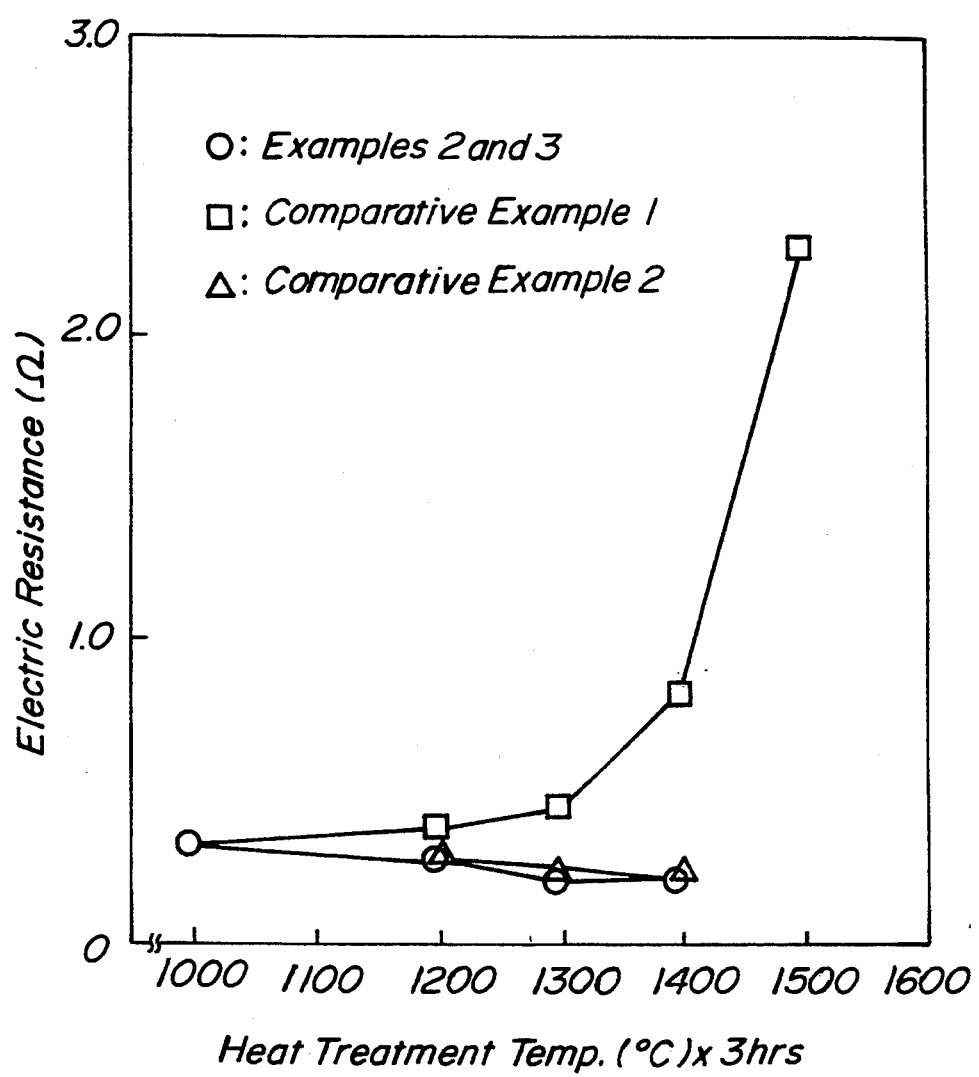
FIG. 7 is a characteristic graph of a thermal sprayed solid electrolyte film showing a relation between condition of the heat treatment and the electric resistance of the film.

The results of the measurements of the samples are shown in FIGS. 6 and 7.

EXAMPLE 3

At first, a material 24 for an air electrode the same as that of Example 2 was prepared as shown in FIG. 2a. Then, 30 parts by weight of trimanganese tetraoxide $Mn_3O_4$ was added to 100 parts by weight of water and agitated by a stirrer to obtain a $Mn_3O_4$ slurry. The slurry was applied on a surface of the material 24 for the air electrode corresponding to Example 2 by a vacuum dipping method to form a coating 25A of a thickness of about 10 μm as shown in FIG. 2b. At this time, the $Mn_3O_4$ was deposited in a layer form in an amount of 1.8 mg per unit surface area of the material 24 for air electrode.

The thus obtained layered structure was heat treated in air at 1,300° C. for 3 hrs to bake and fix the coating 25A on the surface of the material 24 for the air electrode to form an intermediate layer 25 as shown in FIG. 2c. In addition, zirconia stabilized with 8 mole % yttria (8YSZ) was prepared, plasma thermal sprayed on a surface of the intermediate layer 25 to form a zirconia film 26 of a thickness of about 100 μm.

Then, the thus obtained layered structure was heat treated in air at 1,000° C., 1,200° C., 1,300° C. or 1,400° C. for 3 hrs to prepare a layered structure as shown in FIG. 1d. Then, the electric resistance of the layered structure was measured to evaluate the electric properties thereof and the $N_2$ gas permeation coefficient of the layered structure was measured to evaluate the airtight property thereof. The results of the measurements were substantially the same with those of the sample of Example 2 and the differences between the measurements in Example 2 and this Example 3 were within measuremental errors. Therefore, the measured values on each sample of Examples 2 and 3 are summarized and shown in FIGS. 6 and 7.

COMPARATIVE EXAMPLE 1

At first, 8YSZ was plasma thermal sprayed on a surface of a material 24 for the air electrode prepared as in Example 2 to form a zirconia film 26 of a thickness of about 100 μm. Then, the thus obtained layered structure was heat treated in air at 1,000° C., 1,200° C., 1,300° C., 1,400° C. or 1,550° C. for 3 hrs to densify the thermal sprayed films. In order to evaluate the effect of the heat treatment, the films were measured the same as in Example 2. The results of the measurements are shown in FIGS. 6 and 7.

COMPARATIVE EXAMPLE 2

A material for an air electrode made of a perovskite series complexed oxide wherein the A site is portionally defected was prepared. Namely, at first, $La_2O_3$, $SrCO_3$ and $Mn_3O_4$ were prepared as starting raw materials.

Among the starting raw materials, a powder of $La_2O_3$ was preliminarily calcined in air at 900° C. for 3 hrs. Then, each starting raw material was weighed in a mole ratio of La:Sr:Mn=76:19:100, and mixed together in a pot mill in wet process, formed at a pressure of 1 tf/cm² by a press mold method, and heat treated in air at 1,450° C. for 15 hrs to synthesize a perovskite series complexed oxide. The synthesized product was pulverized to obtain a powdery raw material. The thus obtained powdery raw material was analyzed by emission spectrochemical analysis method and X-ray diffraction method to find out that the powdery, raw material consists of a perovskite series complexed oxide having a composition of $(La_{0.8}Sr_{0.2})_{0.95}MnO_3$.

Then, the powdery raw material was formed at a pressure of 500 kgf/cm² by a press mold method, and fired in air at 1,420° C. for 8 hrs.

The open porosity of the thus obtained sintered body was measured by Archimedes method and revealed an open porosity of 27%.

A disc of a diameter of 20 mm and a thickness of 2 mm was cut out from the sintered body to prepare a material for an air electrode. Then, 8YSZ was prepared and plasma thermal sprayed on a surface of the material for the electrode to obtain a zirconia film of a thickness of about 100 μm. Thereafter, the layered structure was heat treated in air at 1,000° C., 1,200° C., 1,300° C. or 1,400° C. for 3 hrs to densify the zirconia film. Afterwards, the electric resistance of the layered structure was measured to evaluate the electric properties thereof and the $N_2$ gas permeation coefficient of the layered structure was measured to evaluate the airtight property thereof. The results of the measurements are shown in FIGS. 6 and 7.

When comparing the samples of Examples 2 and 3 with the samples of Comparative Example 1, temperatures of the heat treatment of Examples 2 and 3 necessary for achieving an $N_2$ gas permeation coefficient of an order of $10^{-9}$ are lower by around 150° C. than that of Comparative Example 1. This is considered due to acceleration of the sintering of the film 26 by virtue of the intermediate layer. Also, when comparing the electric resistance of the samples at the same condition of the heat treatment, the samples of Examples 2 and 3 have lower electric resistance than the samples of Comparative Example 1. The samples of Examples 2 and 3 have no significant difference from the samples of Comparative Example 2 in electric resistance and $N_2$ gas permeation coefficient.

Thereafter, each air electrode substrate used in the samples of Examples 2 and 3 was heat treated in air at 1,000° C., 1,200° C., 1,400° C. or 1,500° C. for 3 hrs, measured for open porosity by Archimedes method to evaluate heat resistant property thereof. The air electrode substrate used in the samples of Comparative Example 2 were also measured for open porosity in the same manner. The results are shown in the following Table 1.

TABLE 1

|  | 1,000° C. × 3 hrs | 1,200° C. × 3 hrs | 1,300° C. × 3 hrs | 1,400° C. × 3 hrs | 1,550° C. × 3 hrs |
|---|---|---|---|---|---|
| Example 1 and 2 | 29% | 29% | 29% | 29% | 27% |
| Control Example 2 | 27% | 27% | 26% | 24% | 9% |

As seen from the results of the measurements shown in the above Table 1, the air electrode substrate is not sintered to decrease the open porosity thereof in the present invention during the process of the heat treatment. Therefore, there is no concern that the diffusion of the oxidizing agent in the air electrode substrate is prevented.

Figure 8:
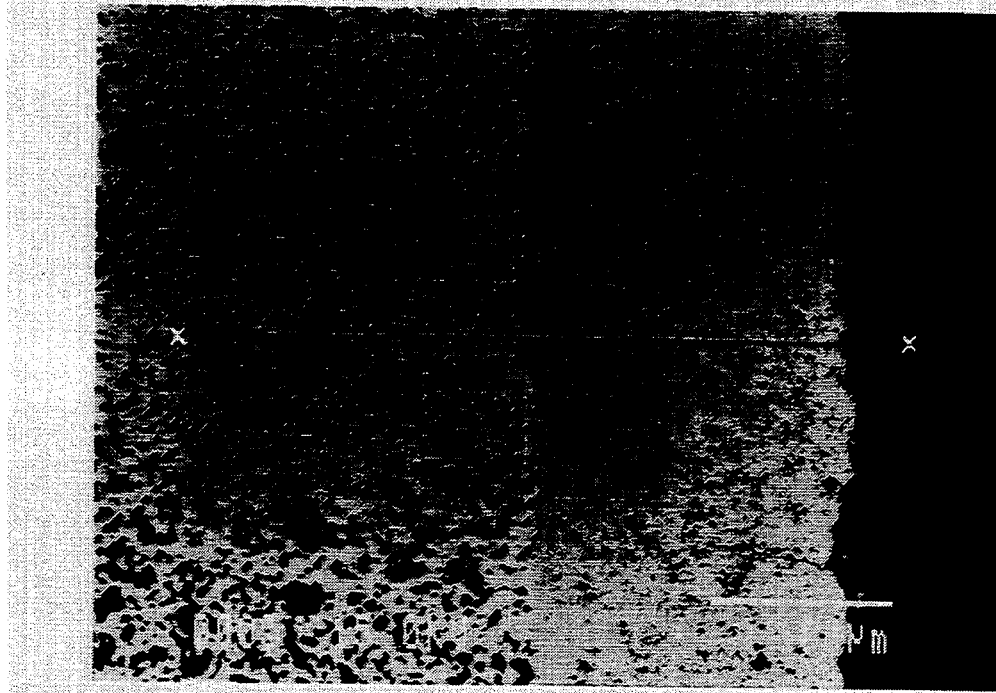
FIG. 8 is a photograph taken by a scanning electron microscope (SEM) showing a polished surface of a sample of an embodiment of the present invention.
Figure 10:
FIG. 10 is a photograph taken by a scanning electron microscope showing an interface between the air electrode substrate and the solid electrolyte film of the present fuel cell.

The samples of Examples 2 and 3 were analyzed as follows. However, the samples were chosen from those heat treated in air at 1,400° C. for 3 hrs. The samples were polished on the cross-sectional surfaces thereof and observed at the polished surfaces by using a scanning electron microscope (SEM). Photographs taken by the SEM are shown in FIGS. 8 and 10. The photograph of FIG. 10 was taken by a more largely enlarged scale than that of FIG. 8, in order to clarify the microstructure at the neighborhood of the interface thereof.

Figure 9:
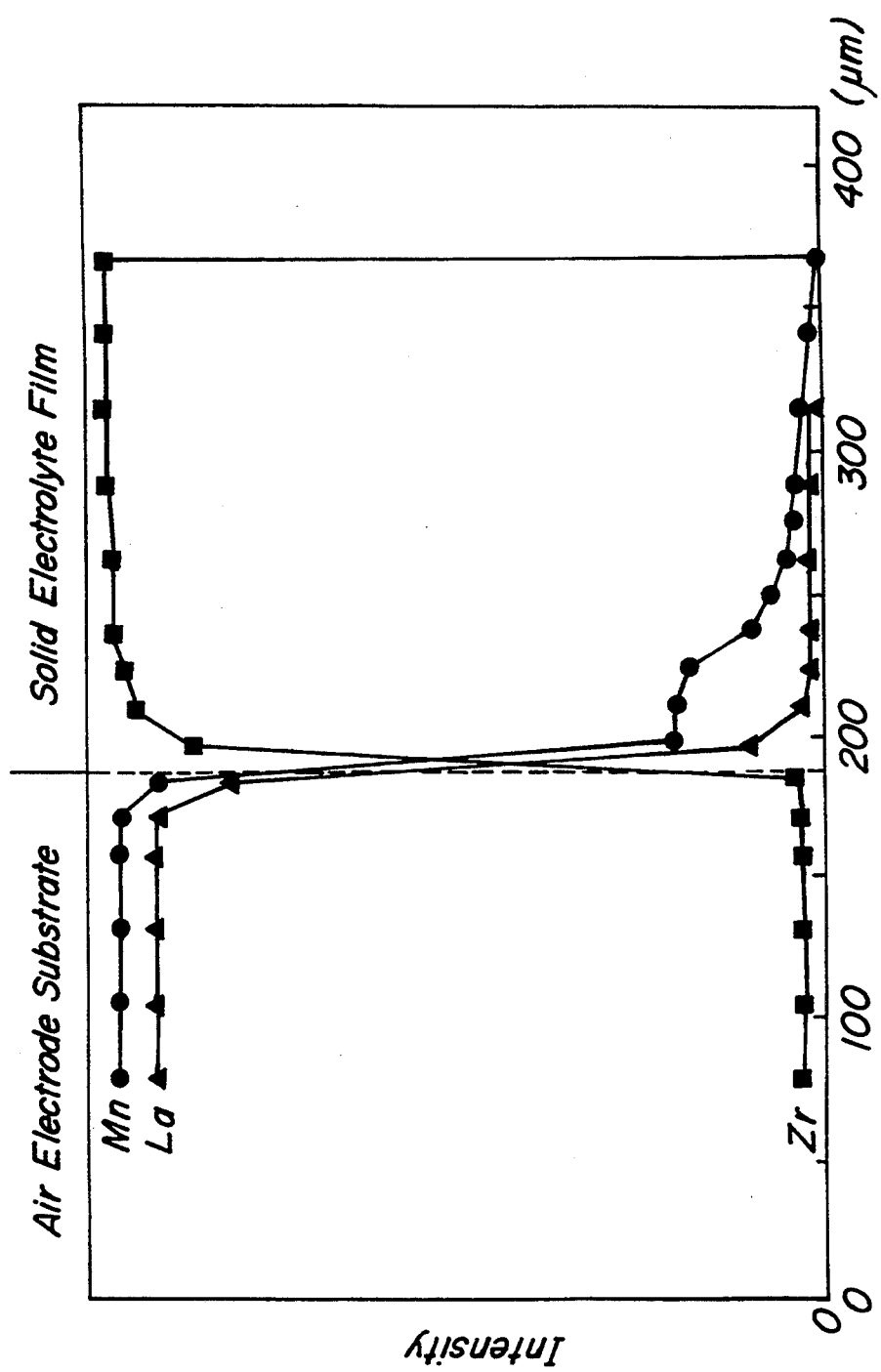
FIG. 9 is a graph showing a result of line analysis of wave length by EPMA on a cross-section of a sample of an embodiment of the present invention.

Also, EPMA was effected on the cross-section as shown in FIG. 8 to line analyze the distribution of the elements Zr, La and Mn. The results are shown in FIG. 9. As seen from FIGS. 8, 9 and 10, the solid electrolyte film has a microstructure particularly densified at the neighborhood of the interface between the air electrode substrate. As seen also from the line analysis, manganese is diffused into the neighborhood of the interface between the air electrode substrate. A lanthanum zirconate layer was not ascertained by the SEM photographs and the line analysis.

Figure 11:
FIG. 11 is a photograph taken by a SEM showing a polished surface of a sample of a comparative example.
Figure 12:
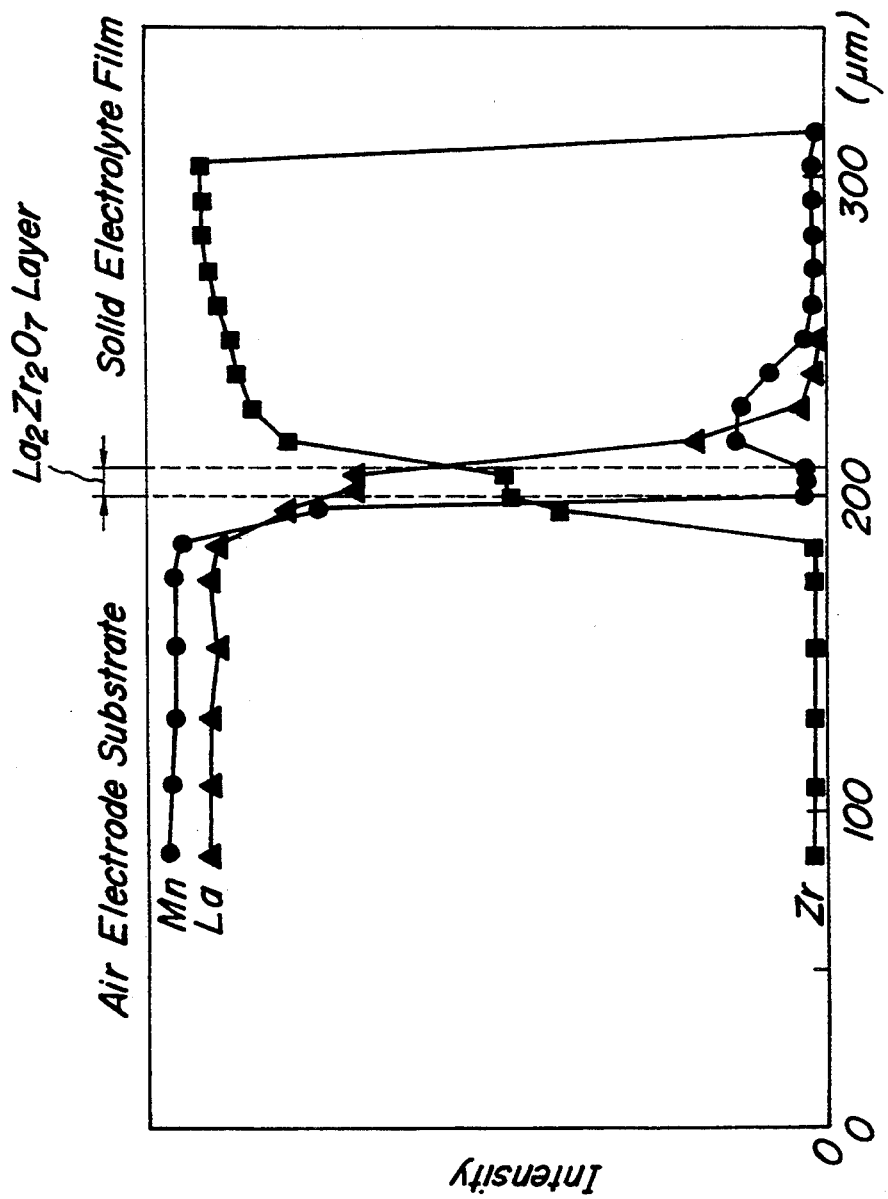
FIG. 12 is a graph showing a result of analysis of wave length by EPMA on a cross-section of a sample of a comparative example.
Figure 13:
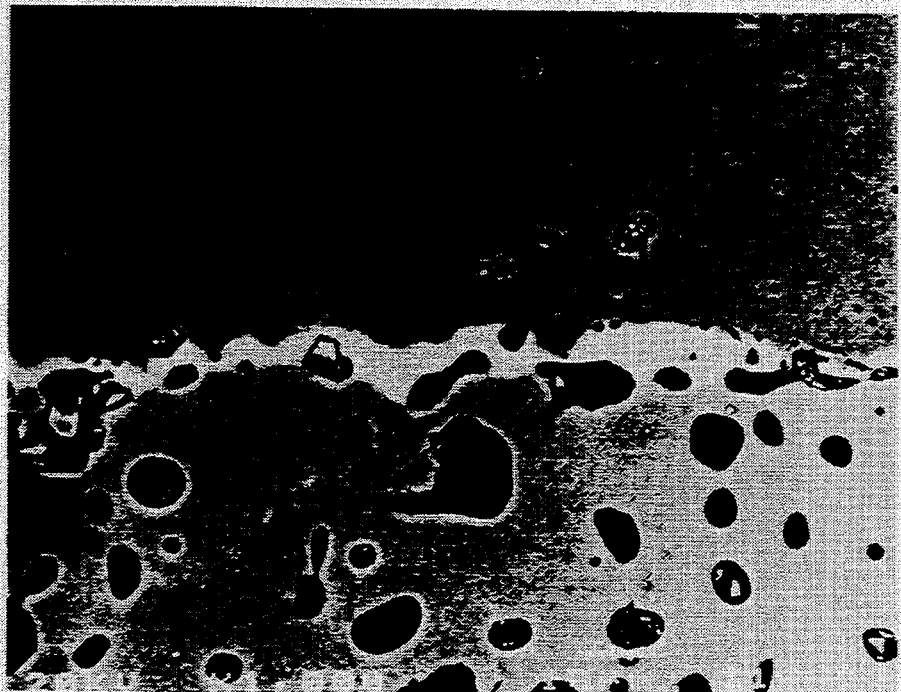
FIG. 13 is a photograph taken by a SEM showing an interface between an air electrode substrate and a solid electrolyte film of a sample of a comparative example.

The above analyses were effected also on the samples of Comparative Example 1. However, for bringing the airtight property, etc., into line, the samples were chosen from those heat treated in air at 1,550° C. for 3 hrs. Photographs taken by the SEM are shown in FIGS. 11 and 13, and line analysis by the EPMA is shown in FIG. 12. The photograph of FIG. 13 was taken by a more enlarged scale than that of FIG. 11, in order to clarify the microstructure at the neighborhood of the interface thereof.

Though the samples of Comparative Example 1 were densified by the heat treatment which was higher in temperature by 150° C. than the heat treatment used for the samples of the present invention to a same densification extent as that of the samples of the present invention, the samples of Comparative Example 1 have a compound layer at the interface between the air electrode substrate and the solid electrolyte film. The compound layer was judged as lanthanum zirconate $La_2Zr_2O_7$ from the results of the line analysis. The lanthanum zirconate is an electrically insulative layer and the formation of the compound is considered as a cause of the decrease of the electric resistance.

From the results of these experiments, it can be understood that the internal resistance of the SOFC can be decreased, the airtight property of the solid electrolyte film can be improved, and the output of the SOFC and the fuel utilization efficiency can be improved by adopting the structure of the present invention.

In order to prove these points in practice, a paste of a nickel-zirconia cermet (Ni:8YSZ=6:4 in volume ratio) was screen printed in a round shape of a diameter of 6 mm on a surface of the solid electrolyte film of the sample of Example 1 (heat treated in air at 1,400° C. for 3 hrs), and baked in air at 1,350° C. for 2 hrs.

Figure 14:
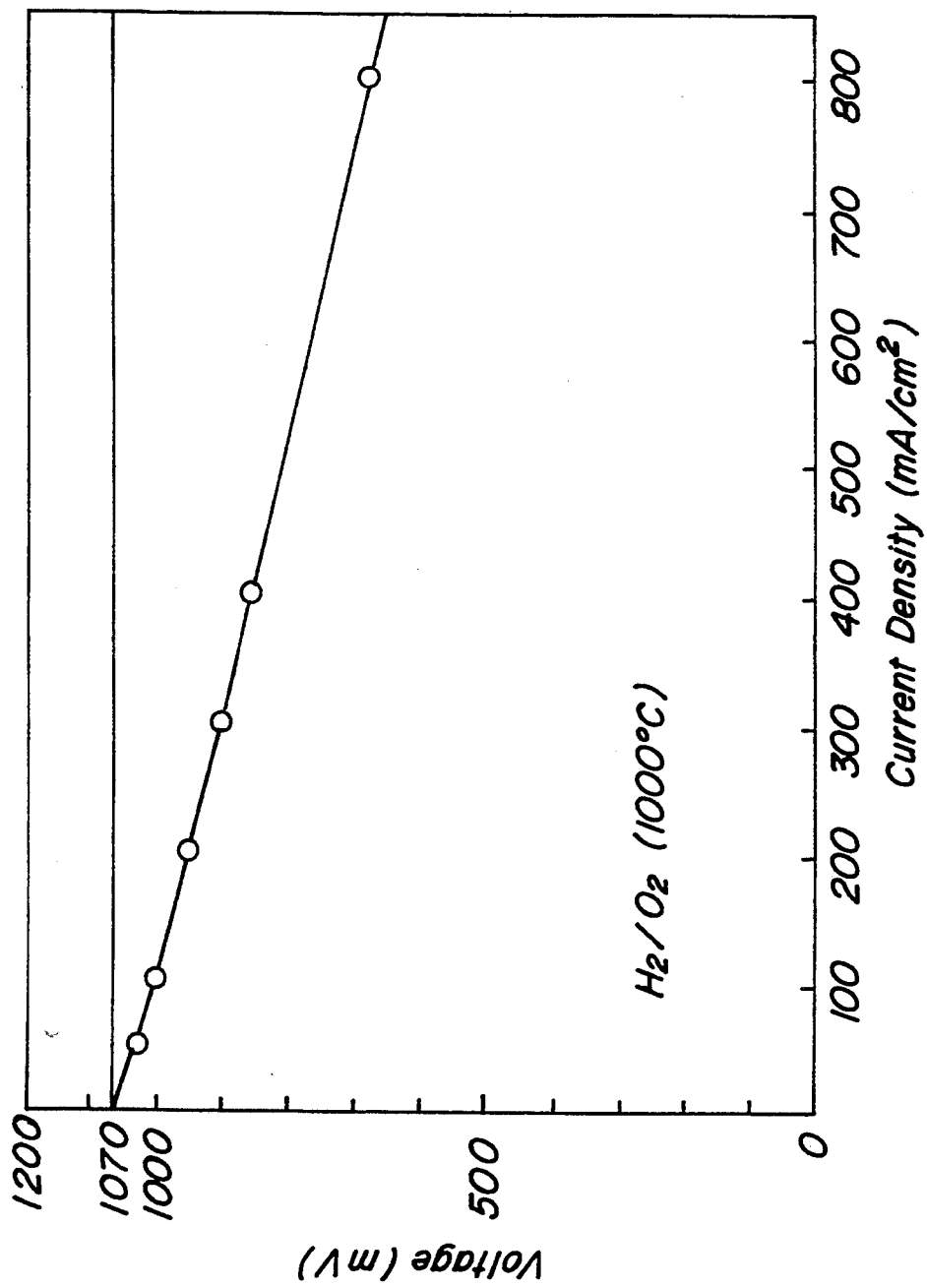
FIG. 14 is a characteristic graph showing a relation between an electric current density and a voltage of a test piece of the SOFC of an embodiment of the present invention.

A test piece of the thus produced flat plate-shaped SOFC was fixed on a jig. Hydrogen humidized at room temperature was introduced into the fuel electrode film side of the SOFC, while an oxygen gas was introduced into the air electrode substrate side of the SOFC to generate an electric current at 1,000° C. A current-voltage characteristic graph of the generated electric current was measured, and the results are shown in FIG. 14.

Figure 15:
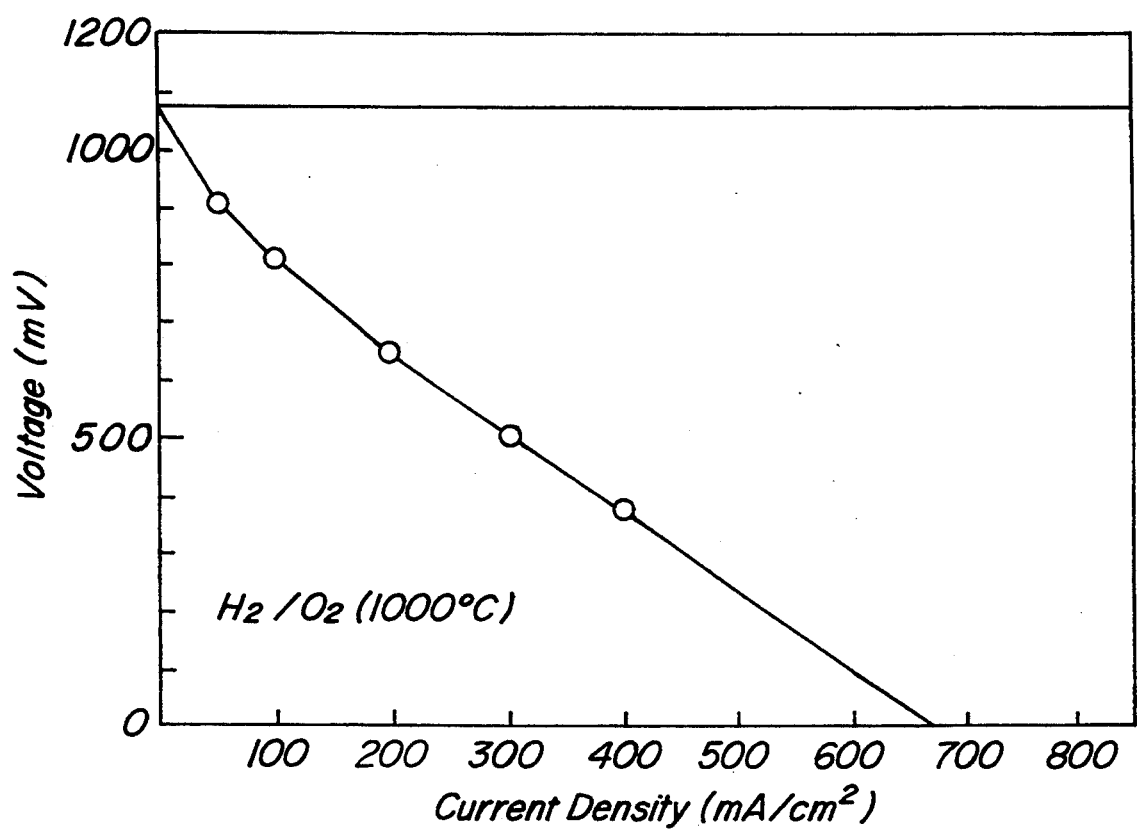
FIG. 15 is a characteristic graph showing a relation between an electric current density and a voltage of a test piece of an SOFC of a comparative example.

In the same manner as described above, a fuel electrode film was provided on a surface of the sample of Comparative Example 1 to prepare a test piece of a flat plate-shaped SOFC, and a current-voltage characteristic graph thereof was measured in the same manner as described above, and the results are shown in FIG. 15.

As the results of the measurements, open end voltages of the samples of Examples 2 and 3 were 1,070 mV, while that of Comparative Example 1 was also 1,070 mV. Thus, in the sample of the present invention, the open end voltage is the same as that of Comparative Example 1 even when the thermal sprayed solid electrolyte film of the sample of the present invention was heat treated at a temperature lower by 150° C. than that of Comparative Example 1. Moreover, short-circuiting electric current of the sample of the present invention is far larger than that of Comparative Example 1, so that the output of the cell of the present invention is considered to have been remarkably increased.

EXAMPLE 4

The procedure of Example 2 was repeated to prepare the plasma thermal sprayed zirconia film 26 of a thickness of about 100 μm on the intermediate layer 25. Then, on the zirconia film 26 was plasma thermal sprayed manganese dioxide to form a compound film 27 of a thickness of about 10 μm.

Subsequently, the layered structure was heat treated in air at 1,000° C., 1,200° C., 1,300° C. or 1,400° C. for 3 hrs to prepare a layered structure as shown in FIG. 17b. Thereafter, $N_2$ gas permeation coefficient and bending strength of the airtight solid electrolyte film 26A were measured.

The measurement of $N_2$ gas permeation coefficient was performed using the apparatus as shown in the block diagram in FIG. 5 and in the same manner as described in Example 2.

Figure 21:
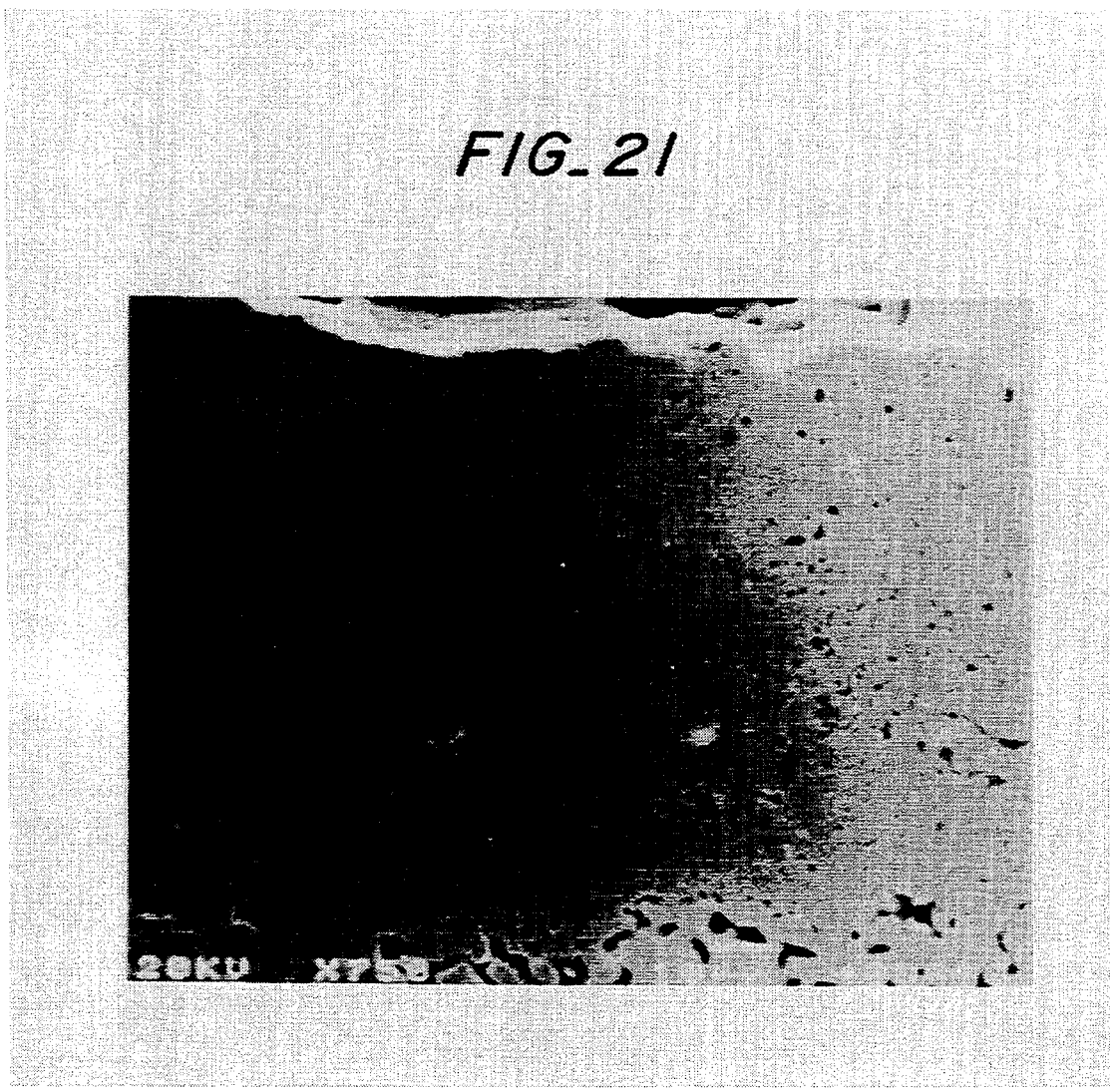
FIG. 21 is a photograph taken by an SEM showing a polished surface of a sample of an embodiment of the present invention.

The measured results are shown in FIG. 21.

Figure 19:
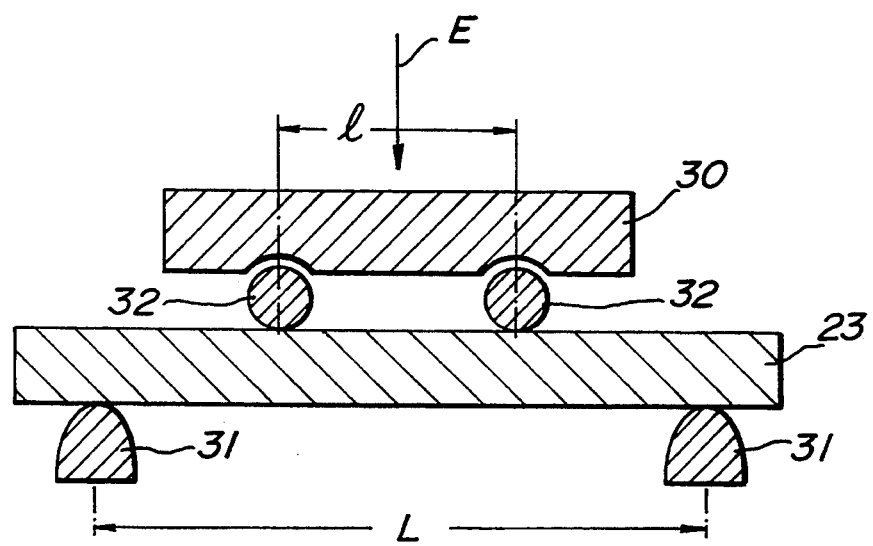
FIG. 19 is a schematic view for explaining a method of measuring a bending strength.

The measurement of bending strength was performed using an apparatus as schematically shown in FIG. 19. Namely, the sample 23 was mounted on a pair of fulcrums 31 having a span length L and a pair of suppressors 32 having a span length l were mounted on the sample 23. The pair of suppressors 32 were fixed by an arm 30. A force was exerted on the arm 30 in a direction as shown by the arrow E to measure a load at breakage of the sample 23.

In this embodiment, the upper span length l was 0.5 cm and the lower span length L was 1.5 cm. Meanwhile, from the layered structure as shown in FIG. 17b the air electrode substrate 24A was removed by a plain grinder and the remaining airtight zirconia film 26A was worked to a specimen of a size of a thickness of 100 μm, a width of 0.2 cm, and a length of 1.8 cm. A load at breakage of the specimen was measured by a load cell, and a bending strength $\sigma$ (kgf/cm²) of the airtight zirconia film 26A was determined based on the following formula:

$$\sigma = 3P(L-l)/2bd^2$$

wherein P is a load (kgf) at breakage of the specimen, L is a lower span length (cm), l is an upper span length (cm), b is a width of the specimen (cm), and d is a thickness of the specimen (cm).

In Example 4, as to the layered structure heat treated at 1,400° C., the airtight zirconia film was measured on bending strength to obtain a value of 18 kgf/cm².

EXAMPLE 5

At first, a layered structure similar to FIG. 16c of Example 4 was prepared as shown in FIG. 18a. Then, 30 parts by weight of trimanganese tetraoxide $Mn_3O_4$ was added to 100 parts by weight of water and agitated by a stirrer to obtain a $Mn_3O_4$ slurry. The slurry was applied on a surface of the zirconia film 26 corresponding to Example 4 by a vacuum dipping method to form a compound film 27A of a thickness of about 10 μm as shown in FIG. 18b. At this time, the $Mn_3O_4$ was deposited in a layer form in an amount of 1.8 mg per unit surface area of the zirconia film 26.

Figure 20:
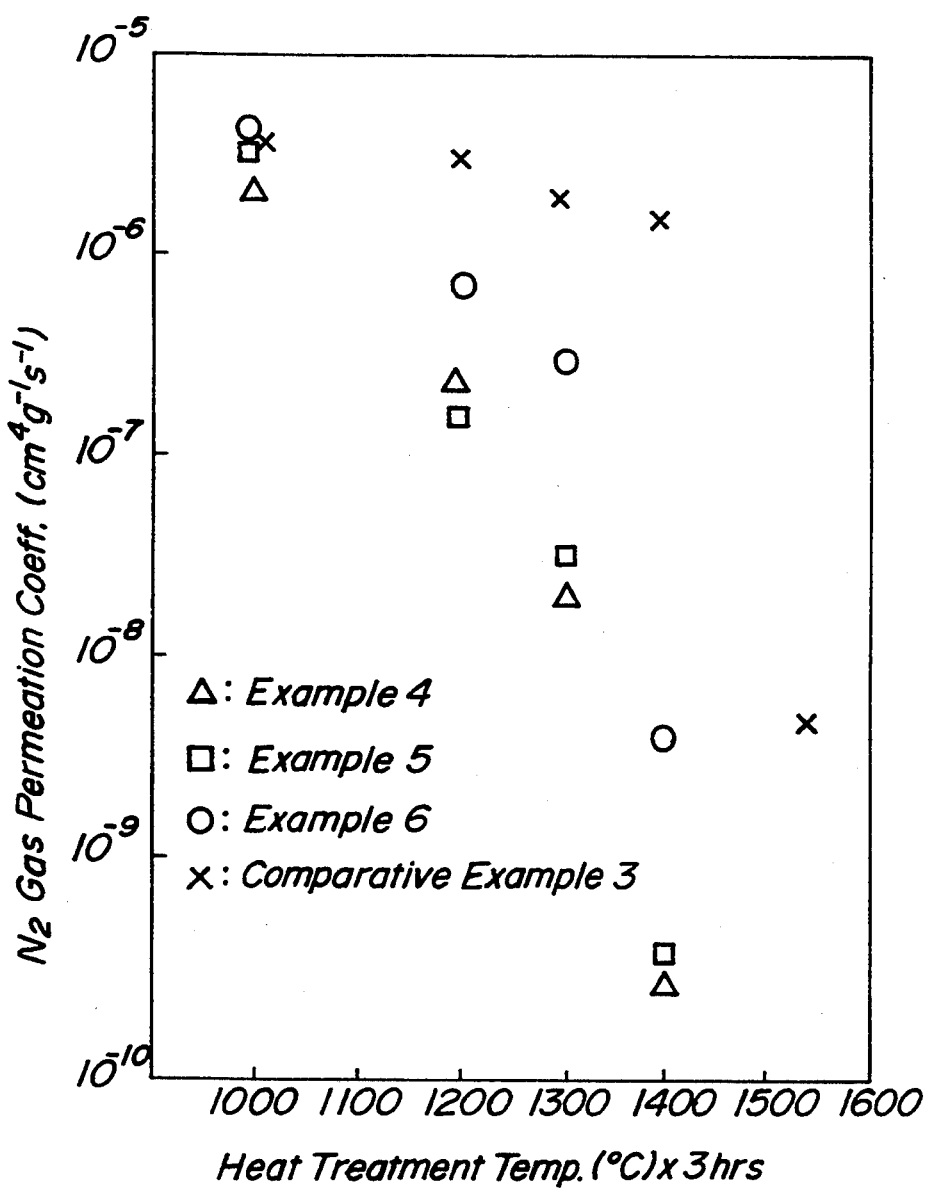
FIG. 20 is a graph showing $N_2$ permeation coefficients of solid electrolyte films of embodiments of the present invention and comparative examples.

Then, the thus obtained layered structure was heat treated in air at 1,000° C., 1,200° C., 1,300° C. or 1,400° C. for 3 hrs to obtain a layered structure as shown in FIG. 17b. Thereafter, $N_2$ gas permeation coefficient of the airtight zirconia film 26A was measured. The measured values are shown in FIG. 20. Also, as to the layered structure heat treated at 1,400° C., bending strength of the airtight zirconia film 26A was measured to obtain a value of 17 kgf/cm².

EXAMPLE 6

The procedure of Example 4 was repeated to produce a layered structure consisting of the material 24 for an air electrode, the intermediate film 25 and the zirconia film 26 as shown in FIG. 16c. The layered structure was heat treated in air at 1,000° C., 1,200° C., 1,300° C. or 1,400° C. for 3 hrs to densify the zirconia film 26. Then, $N_2$ gas permeation coefficient of the heat treated zirconia film was measured. The measured results are shown in FIG. 20. Also, bending strength of the zirconia film of the specimen heat treated at 1,400° C. was measured to obtain a value of 4 kgf/cm$^2$.

COMPARATIVE EXAMPLE 3

8YSZ was plasma thermal sprayed on a surface of the material 24 for air electrode produced by Example 4 to obtain a zirconia film of a thickness of about 100 μm. Then, the thus obtained layered structure was heat treated in air at 1,000° C., 1,200° C., 1,300° C., 1,400° C. or 1,500° C. for 3 hrs to densify the zirconia film 26. Thereafter, $N_2$ gas permeation coefficients of the zirconia film after the heat treatment were measured. The measured results are shown in FIG. 20.

When comparing the specimens of Examples 4 and 5 with the specimens of Examples 6 and Comparative Example 3, $N_2$ gas permeation coefficients of the specimens of Examples 4 and 5 heat treated at 1,400° C. are on the order of $10^{-10}$, whereas those of Example 6 are on the order of $10^{-9}$ and those of Comparative Example 3 are on the order of $10^{-6}$. Thus, it is considered that the sintering of the zirconia film 26 is accelerated in Examples 4 and 5 by virtue of the manganese compound films 25 and 27. Also, the bending strength of the specimens of Examples 4 and 5 are 4 times or more higher than those of Example 6.

The specimen of Example 4 was analyzed in the following way by a photograph taken by a microscope. The specimen was heat treated in air at 1,400° C. for 3 hrs. The specimen was polished at a cross-section thereof and the polished cross-section was observed by a SEM. A photograph taken by the SEM is shown in FIG. 21. From the photograph, it can be seen that the airtight zirconia film 26A has a microstructure uniformly densified from the interface of the air electrode substrate to nearly the surface.

Figure 22:
FIG. 22 is a photograph taken by an SEM showing a polished surface of the present invention.

The specimen of Example 6 was also analyzed in the above way. The specimen was that heat treated in air at 1,400° C. for 3 hrs. A photograph taken by the SEM is shown in FIG. 22. From the photograph, it can be seen that the airtight zirconia film has a microstructure not densified near the surface though it was densified at the interface between the air electrode substrate.

From these experimental results it is understood that the whole solid electrolyte film can be uniformly densified by the adaption of the structure of the present invention, so that the airtight property of the solid electrolyte film can be improved to increase the SOFC output and the fuel utilization efficiency. Also, the strength of the solid electrolyte film can be remarkably increased by the densification, so that a reliable SOFC can be mass produced.

In order to prove these points in practice, a paste of nickel-zirconia cermet (Ni:8YSZ=6:4 in volume ratio) was screen printed to a round shape of a diameter of 6 mm on a surface of the specimen of Example 4 (heat treated in air at 1,400° C. for 3 hrs), and baked in air at 1,350° C. for 2 hrs.

Figure 23:
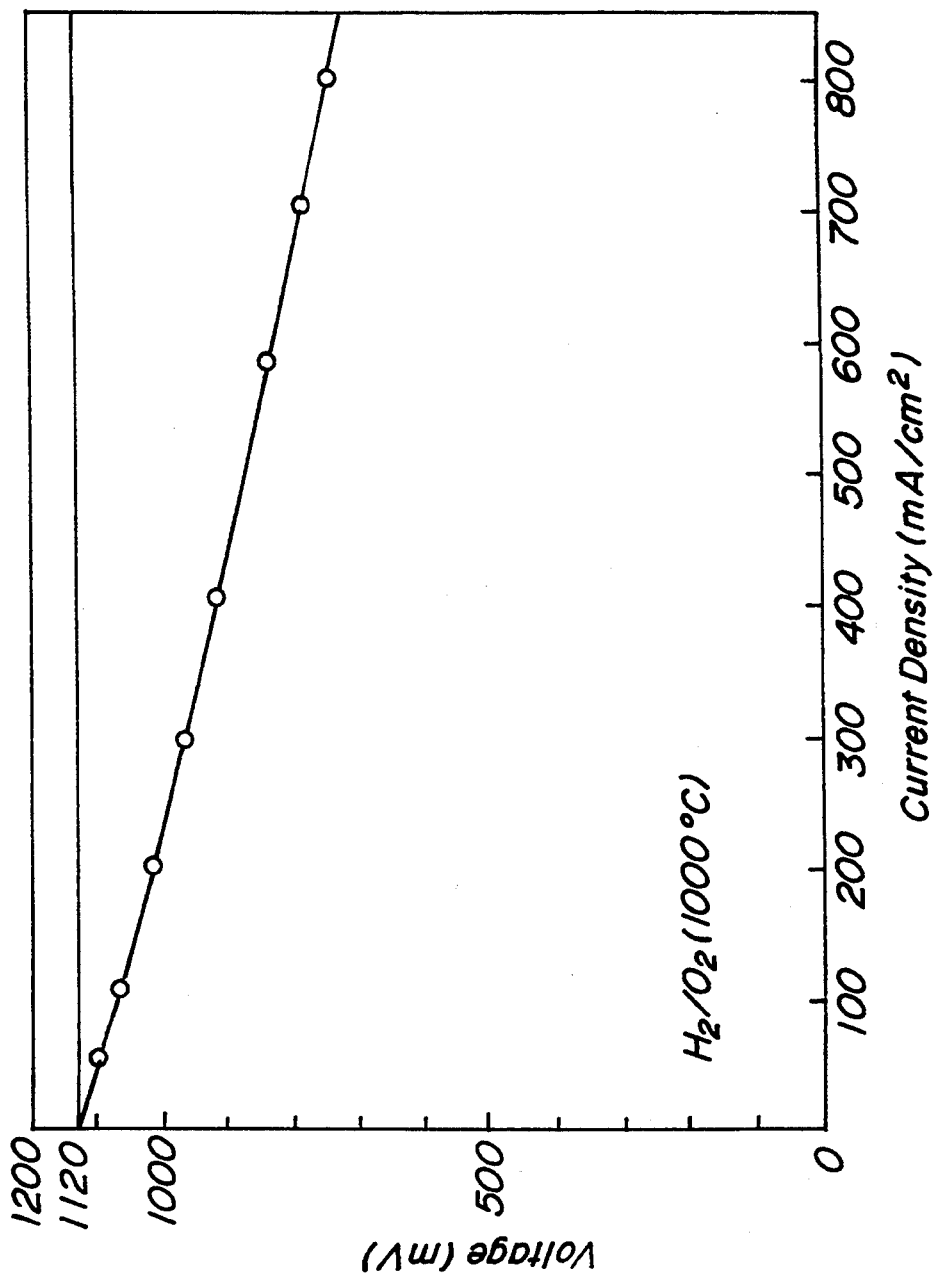
FIG. 23 is a graph showing a relation between the electric current density and the voltage of a test piece of an SOFC of an embodiment of the present invention.

A specimen of the thus produced flat plateshaped SOFC was fixed on a jig, hydrogen humidized at room temperature was introduced into the fuel electrode film side of the SOFC, while an oxygen gas was introduced into the air electrode substrate side of the SOFC to generate an electric current at 1,000° C. A current-voltage characteristic graph of the generated electric current was measured, and the results are shown in FIG. 23.

In the same manner as described above, a fuel electrode film was provided on a surface of the sample of Example 6 (heat treated in air at 1,400° C. for 3 hrs) to prepare a specimen of a flat plate-shaped SOFC, and a current-voltage characteristic graph thereof was measured in the same manner as described above, and the same results as shown in FIG. 14 were obtained.

Also, in the same manner as described above, a fuel electrode film was provided on a surface of the sample of Comparative Example 3 (heat treated in air at 1,550° C. for 3 hrs) to prepare a specimen of a flat plate-shaped SOFC, and a current-voltage characteristic graph thereof was measured in the same manner as described above, and the same results as shown in FIG. 15 were obtained.

As a result, open end voltage of the sample of Example 4 was 1,120 mV, while those of Example 6 and Comparative Example 3 were 1,070 mV. In the sample of Example 4, the open end voltage was increased, the short-circuiting current was increased, and the output of the unit cell was improved.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. A solid electrolyte fuel cell comprising:
   an air electrode substrate comprising a perovskite series complexed oxide represented by $(La_{1-y}A_y)MO_3$, wherein A is at least one alkaline earth metal, M is manganese or cobalt, and y is $0 \leq y \leq 0.4$;
   a zirconia solid electrolyte film formed on said air electrode substrate and containing manganese or cobalt present as a solid solute in a region of said film substantially adjacent an interface between said film and said air electrode substrate, while substantially no highly resistive layer made of a compound containing lanthanum and zirconium is present at said interface; and
   a fuel electrode film formed on said solid electrolyte film at a surface opposite to said air electrode substrate.

2. The fuel cell of claim 1, wherein said air electrode substrate has a thickness of about 0.5 mm.

3. The fuel cell of claim 1, wherein said air electrode substrate has a porosity of at least 25%.

4. The fuel cell of claim 1, wherein said manganese or cobalt is present as a solid solute in said region of said zirconia solid electrolyte film in an amount of about 3–15 mol %.

* * * * *